July 9, 1963 J. C. WESTMONT 3,096,842
DRIVING AND WEIGHT DISTRIBUTION ARRANGEMENT
FOR SELF-PROPELLED GOLF CARTS
Filed Sept. 2, 1959

INVENTOR
JOHN C. WESTMONT

BY

ATTORNEY

United States Patent Office 3,096,842
Patented July 9, 1963

3,096,842
DRIVING AND WEIGHT DISTRIBUTION ARRANGEMENT FOR SELF-PROPELLED GOLF CARTS
John C. Westmont, Madison, Wis., assignor to George A. Westmont, Madison, Wis.
Filed Sept. 2, 1959, Ser. No. 837,609
1 Claim. (Cl. 180—54)

This invention relates to a new and novel driving arrangement for motor vehicles and more particularly to a novel arrangement of the engine, clutch, brake, transmission and differential of the motor vehicle.

Prior to this time small motor driven vehicles such as golf carts, self-propelled lawn mowers, small tractors, and the like have been characterized by being unduly cumbersome and inefficient in operation due, primarily, to the bulk of the vehicle and the improper weight distribution on the axles of the above named parts of the vehicle. Weight distribution in a vehicle is very important for reasons of utility and safety, especially in the case of small motor vehicles which may travel over uneven and hilly terrain such as a golf course.

An object of the present invention is to provide a driving arrangement for small motor vehicles in which optimum weight distribution in the vehicle is obtained.

Another object is to provide a driving arrangement for motor vehicles which will render motor vehicles less cumbersome and more compact.

A further object is to provide a low center of gravity in a vehicle and thereby increase the stability of the vehicle during operation.

Another object is to provide a simplified driving arrangement for motor vehicles.

Further objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
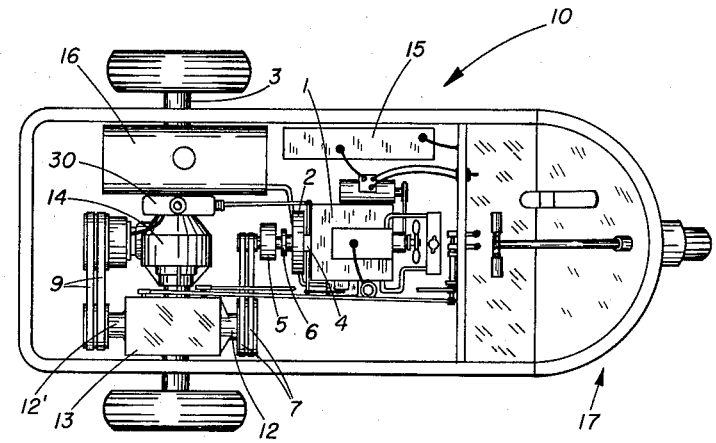
FIGURE 1 is a plan view of the mechanical parts of the motor vehicle of this invention.

In FIGURE 1 is illustrated in plan view a motor vehicle indicated generally as 10 comprised with a power unit such as an internal combustion engine 1 and a power train having as components fly wheel 2, drive axle 3, drive shaft 4, clutch 5, coupling 6 between drive shaft 4 and clutch 5, and differential 14 sequentially connected to axle and wheel members.

Forward portion of motor vehicle 10 is indicated generally as 17. Engine 1 is situated substantially in the center of the vehicle 10. Power from the engine 1 may be transmitted through drive shaft 4 to fly wheel 2 and thence to V-belt 7. Power flow may in turn be transmitted from V-belt 7 to jack shaft 12 and rearwardly therefrom through transmission 13 to jack shaft 12' in substantially the same planar axis as jack shaft 12. Sheave 9 may be operably connected to jack shaft 12' and power may be transmitted from V-belt 9 in a forwardly direction to differential 14 and thence to the axle of vehicle 10. It may be seen that the power flow upon leaving engine 1 is caused to follow a course which may be defined as being of U configuration or of retroverted direction wherein the power flow first travels to the rearward section of the vehicle 10 thence in an outwardly lateral direction to jack shaft 12, thence again rearwardly along jack shaft 12, thence in an inwardly lateral direction to the center line of the vehicle, thence in a forwardly direction to differential 14 integral with the axle housing, thence through axles to the two driven wheels.

Transmission 13 may be linked to shift levers in forward portion 17 of vehicle 10 and have three forward speeds and one reverse speed. It may be pivotally mounted and act as a belt tightener for the sheaves on the jack shafts 12 and 12'. Bearings may be installed at both ends of transmission 13 to compensate for radial loads that V-belts 7 and 9 place on input jack shaft 12 and output jack shaft 12'.

Battery 15 may be situated in the frontal part of the chassis with gas tank 16 situated on the same side of vehicle 15 to the rear of battery 15 and over axle 3. Transmission 13 may be situated over the rear axle on the side opposite battery 15 and gas tank 16. The muffler (not shown) may be situated over axle 3 directly to the rear of engine 1 and be juxtaposed between gas tank 16 and transmission 13. The particular arrangement of battery, gas tank, differential, rear axle, transmission, and motor that are described have been found to balance the vehicle in an optimum manner. Particularly the battery and gas tank serve to balance the weight of the transmission.

Figure 2:
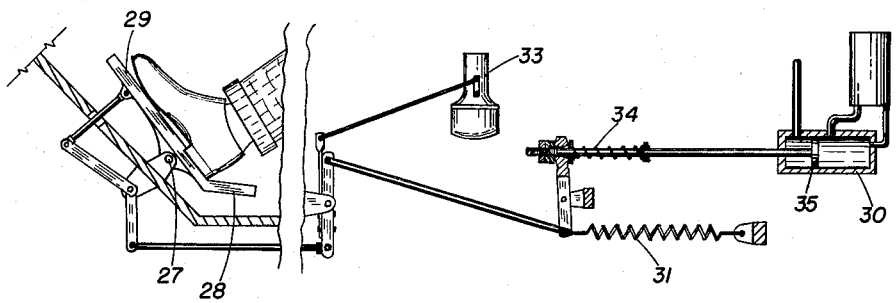
FIGURE 2 is a schematic view of a portion of the vehicle of FIGURE 1.

In FIGURE 2 a particular arrangement of accelerator and brake are shown. Pedal 29 may be attached to the floor of the vehicle by pivot 27 with the lowermost portion 28 thereof adapted to accommodate the heel of the operator's foot and to serve as a brake pedal.

Brake master cylinder 30 may be spring loaded by spring 31 and be connected through appropriate linkage to pedal 29 in a manner such that pedal 29 may be depressed to accelerate the vehicle and hydraulic pressure may be relieved to brake master cylinder 30. Conversely, upon releasing pedal 29 brake master cylinder 30 may be pressurized and be actuated. To increase the braking action the lower section 28 of accelerated pedal 29 may be depressed by the operator's heel. It can be seen from FIGURE 2 that the above arrangement may result in one of two conditions, the first being the acceleration of vehicle 10 through pressure actuation of pedal 29, the second being the braking of vehicle 10 through release of pedal 29. Carburetor 33 may be linked to pedal 29 in a conventional manner. Spring 34 acts to insure that master brake cylinder 30 is unpressurized when pedal 29 is depressed by maintaining piston 35 to the extreme right with reference to FIGURE 2. In FIGURE 2, pedal 29 is shown in nondepressed position and the vehicle brake is applied.

It is contemplated that conventional coupling means other than V-belts may be utilized with this invention to operably connect the component shafts of the machine while retaining the inventive arrangement of component parts as described. Reference has been made to an ordinary clutch, brake, power unit, etc., however, it may be seen that there are many possible modifications which can be substituted and which would be equally as practical as those means that have been described. Thus, a centrifugal clutch may be preferred, however, a mechanical clutch would be equally operable. Although hydraulically actuated brakes are to be preferred, mechanical, air or electric brakes might be used. An internal combustion engine might be replaced by electric batteries and motors or by other motive power means.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claim.

I claim:
A driving arrangement for a motor vehicle comprising a motor at the measured center line of the vehicle, power transfer means comprising a transmission laterally disposed from the center line of said vehicle and over the driving axle of the vehicle, a fuel tank and a battery, at least one of said fuel tank and said battery disposed laterally opposite said center line from said power transfer means, said transmission counterbalancing at least one of said other laterally disposed members of said vehicle, a differential in said axle, said power flow being characterized by a circuit originating outward laterally, thence rearwardly, thence inward laterally.

References Cited in the file of this patent

UNITED STATES PATENTS

| | | |
|---|---|---|
| 2,322,477 | Sjoberg | June 22, 1943 |
| 2,344,983 | Fageol | Mar. 28, 1944 |
| 2,406,797 | Buckendale | Sept. 3, 1946 |
| 2,453,069 | Hutchings | Nov. 2, 1948 |
| 2,531,268 | Herrington | Nov. 21, 1950 |
| 2,561,576 | Johnson | July 24, 1951 |
| 2,570,319 | Cassady | Oct. 9, 1951 |
| 2,645,299 | Vincent | July 14, 1953 |